(12) United States Patent
Nagao

(10) Patent No.: US 7,653,303 B2
(45) Date of Patent: Jan. 26, 2010

(54) DIGITAL CAMERA AND DIGITAL CAMERA PRINTING SYSTEM APPLIED THEREON

(75) Inventor: Seiji Nagao, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 588 days.

(21) Appl. No.: 11/485,966

(22) Filed: Jul. 14, 2006

(65) Prior Publication Data

US 2007/0014568 A1    Jan. 18, 2007

(30) Foreign Application Priority Data

Jul. 15, 2005   (JP)   ............................. 2005-206569
May 25, 2006   (JP)   ............................. 2006-145240

(51) Int. Cl.
G03B 17/48   (2006.01)

(52) U.S. Cl. ..................................... 396/429
(58) Field of Classification Search ................ 396/429; 348/207.2, 231.2, 231.3

See application file for complete search history.

(56) References Cited

U.S. PATENT DOCUMENTS

| 5,764,278 A | 6/1998 | Nagao |
| 5,898,457 A | 4/1999 | Nagao et al. |
| 2005/0219367 A1 * | 10/2005 | Kanda et al. ............. 348/207.2 |

FOREIGN PATENT DOCUMENTS

| JP | 2000-299809 | 10/2000 |
| JP | 2001-128153 | 5/2001 |
| JP | 2001-268417 | 9/2001 |
| JP | 2002-354309 | 12/2002 |
| JP | 2002-369125 | 12/2002 |
| JP | 2003-69988 | 3/2003 |
| JP | 2003-134359 | 5/2003 |
| JP | 2003-158696 | 5/2003 |
| JP | 2003-224750 | 8/2003 |
| JP | 2004-15533 | 1/2004 |
| JP | 2004-112708 | 4/2004 |
| JP | 2004-120024 | 4/2004 |
| JP | 2004-363888 | 12/2004 |
| JP | 2005-12272 | 1/2005 |
| JP | 2005-12273 | 1/2005 |
| JP | 2005-234839 | 9/2005 |

* cited by examiner

Primary Examiner—W. B. Perkey
(74) Attorney, Agent, or Firm—Oblon, Spivak, McClelland, Maier & Neustadt, L.L.P.

(57) ABSTRACT

A digital camera and a digital camera printing system which confirms whether there exists flawed photographic images, and the type of flaws which exist in order to avoid wasting photographic printing paper. The digital camera printing system includes a storing unit for storing photographic images; a determination unit for determining whether the photographic images are of flawless or flawed photographic images; and a print-out executing unit for executing print out of the photographic images stored in the storing unit. It is possible to select executions between an all-print-out mode for printing out all images which include the flawed and flawless photographic images, and a list print-out for printing out a list of the flawed photographic images together with the flawless photographic images.

18 Claims, 12 Drawing Sheets

FIG. 8

| PRINT SETUP | |
|---|---|
| FLAWED PHOTOGRAPHIC IMAGE PRINT: | YES   NO |
| PAPER TYPE | PHOTO |
| PAPER SIZE | A4 |
| DATE/TIME PRINT | ON |

MENU : CANCEL                    OK : SAVE SETTINGS

FIG. 9B

SCRIPT EXAMPLE

```
<PrintRequest>
    <Format>
        <thumbnail list>
            <FileNo.1>
                <FileName>
                    100RICOH/RIMG001.JPG
                <ShootTime>
                    2004/01/01 18:30:30
                <PictureState>
                    Blurring
            </FileNo.1>
            <FileNo.2>
               . . . . . .
            </FileNo.n>
        </thumbnail list>
    </Format>
</PrintRequest>
```

RIMG001.JPG

CAMERA SHAKING

........        ........

RIMG006.JPG

BLURRING

........        ........

RIMG007.JPG

BAD EXPOSURE

<CAMERA SHAKING>

100RICOH/RIMG001.JPG
100RICOH/RIMG004.JPG
100RICOH/RIMG005.JPG
100RICOH/RIMG006.JPG
100RICOH/RIMG007.JPG
100RICOH/RIMG008.JPG

. . . . . . . . . . . . . . . . . . .

<BLURRING>

100RICOH/RIMG001.JPG
100RICOH/RIMG006.JPG
100RICOH/RIMG007.JPG
100RICOH/RIMG006.JPG

. . . . . . . . . . . . . . . . . . .

<BAD EXPOSURE>

100RICOH/RIMG007.JPG
100RICOH/RIMG008.JPG

. . . . . . . . . . . . . . . . . . .

DIGITAL CAMERA AND DIGITAL CAMERA PRINTING SYSTEM APPLIED THEREON

The present application claims the priority benefit of Japanese Patent Application No. 2005-206569 filed on Jul. 15, 2005 and Japanese Patent Application No. 2006-145240 filed on May 25, 2006, the contents of which are incorporated herein by reference.

BACKGROUND OF THE INVENTION

1. Field of the Invention

The present invention relates to a digital printing system applied on a digital camera for printing out photographic images photographed by the digital camera.

2. Description of Related Art

Conventionally, a digital camera printing system for printing out all images including flawed photographic images, such as camera-shaking, blurring, and bad exposure etc, onto photographic printing paper is known. In recent years, a digital camera having a recently taken photographic image printing mode to print a plurality of unprinted images easily with reference to a print history recorded in an image memory of the digital camera has also been known, for example in Japanese Patent application Laid open No. 2003-158696.

In addition, a digital camera printing system to print sequentially photographic images unprinted at least till now based on the print history in the image memory is also known, for example in Japanese Patent application Laid open No. 2004-15533.

Although it is a user's desire to keep a record of all the photographic images, it costs too much if all the photographic images including both flawless photographic images and flawed photographic images such as camera-shaking, blurring, and bad exposure are printed out on photographic printing paper. Therefore, it is desired to dispose automatically the flawed photographic images recorded in a recording unit of the digital camera and print out only the flawless photographic images when the photographic images are printed.

Although it will save the photographic printing paper to print out only the flawless photographic images, there is a disadvantage in that it is not possible to confirm whether there are the flawed photographic images, and what kinds of the flawed photographic images exist.

SUMMARY OF THE INVENTION

Accordingly, it is an object of the present invention to provide a digital camera and a digital camera printing system applied thereon by which it is possible to confirm whether or not there are flawed photographic images, and what kind of the flawed photographic images exist, and to avoid wasting photographic printing paper.

To accomplish the aforementioned object, the present invention provides a digital camera printing system applied on a digital camera comprising a storing unit configured for storing photographic images; a determination unit configured for determining whether the photographic images are of flawless photographic images or flawed photographic images; and a print-out executing unit configured for executing print out of the photographic images stored in the storing unit; wherein the digital camera printing system is configured to selectively execute an all-print-out mode configured for printing out all images which include the flawed photographic images and the flawless photographic images and a list print-out mode configured for printing out a list of the flawed photographic images together with the flawless photographic images.

According to the aforementioned configuration of the present invention, it is possible to make a selection according to a user's desire between a print-out of all images which include the flawed photographic images and flawless photographic images and a print-out of a list of the flawed photographic images together with the flawless photographic images, therefore it is possible to confirm whether there are the flawed photographic images existed or not, and what kinds of the flawed photographic images there are if there exists the flawed photographic images, in order to avoid wasting the photographic printing paper.

Moreover, according to the configuration of the present invention, it is possible to confirm a flawed image by viewing its thumbnail directly.

Furthermore, according to the configuration of the present invention, it is possible to confirm whether a flawed image had been printed or not.

BRIEF DESCRIPTION OF THE DRAWINGS

FIG. 8 illustrates a print setting screen of the digital camera according to one preferred embodiment of the present invention;

FIG. 9B illustrates a print-request script of printing flawed photographic images according to one preferred embodiment of the present invention;

FIG. 11 illustrates one example of a list of the flawed photographic images according to one preferred embodiment of the present invention;

DETAILED DESCRIPTION OF PREFERRED EMBODIMENTS

Figure 1:
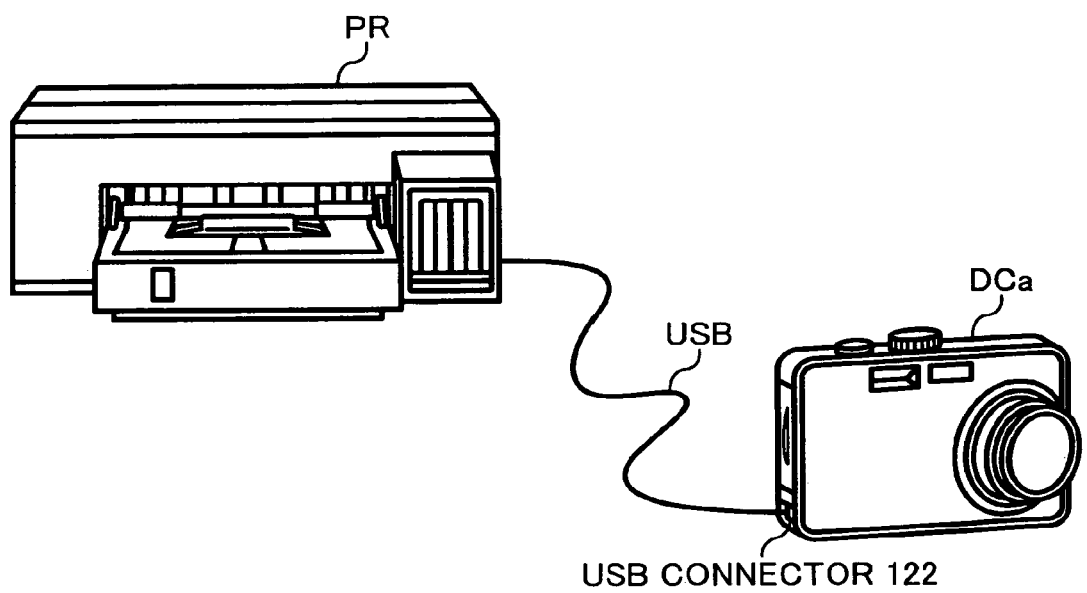
FIG. 1 illustrates a diagram of connection between a digital camera and a printer according to one preferred embodiment of the present invention.
Figure 2:
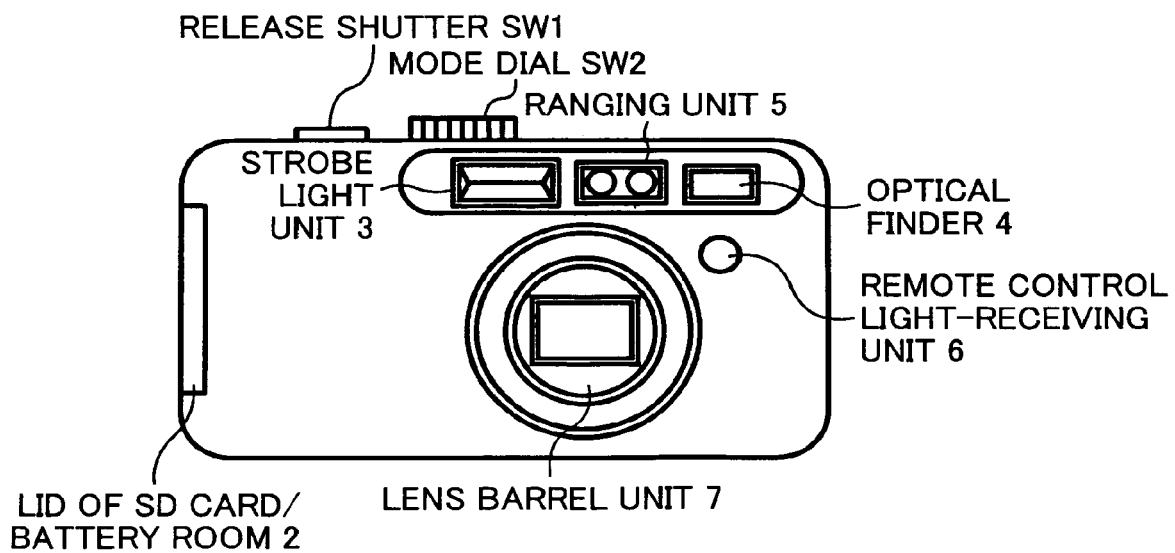
FIG. 2 illustrates a front view of the digital camera according to one preferred embodiment of the present invention.
Figure 3:
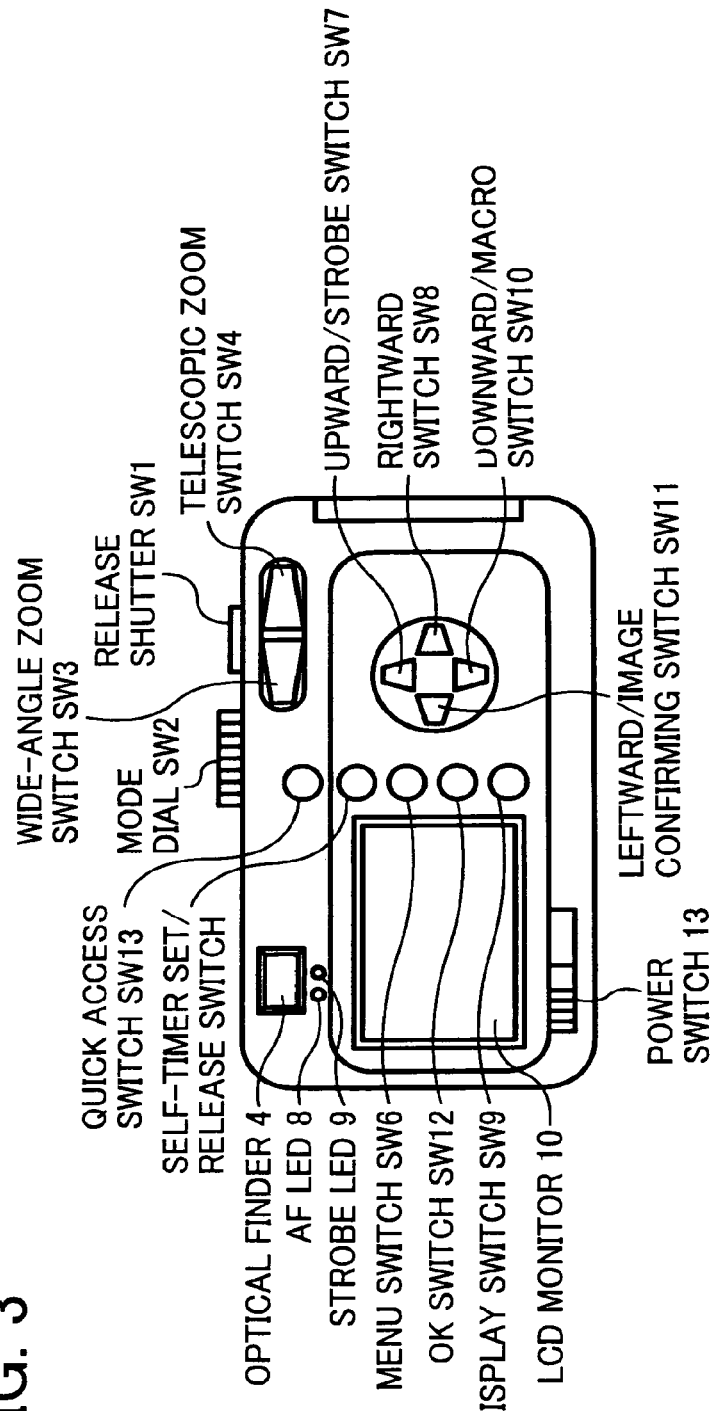
FIG. 3 illustrates a rear view of the digital camera according to one preferred embodiment of the present invention.
Figure 4:
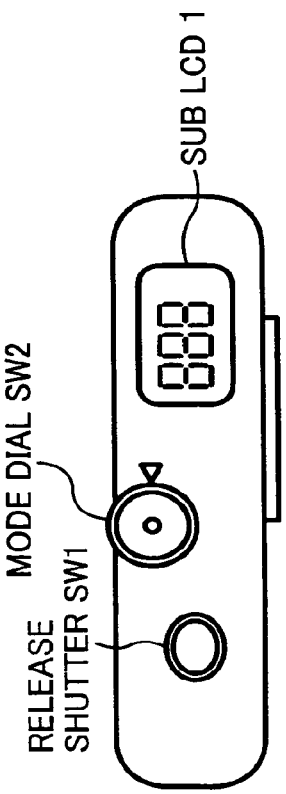
FIG. 4 illustrates a top view of the digital camera according to one preferred embodiment of the present invention.
Figure 5:
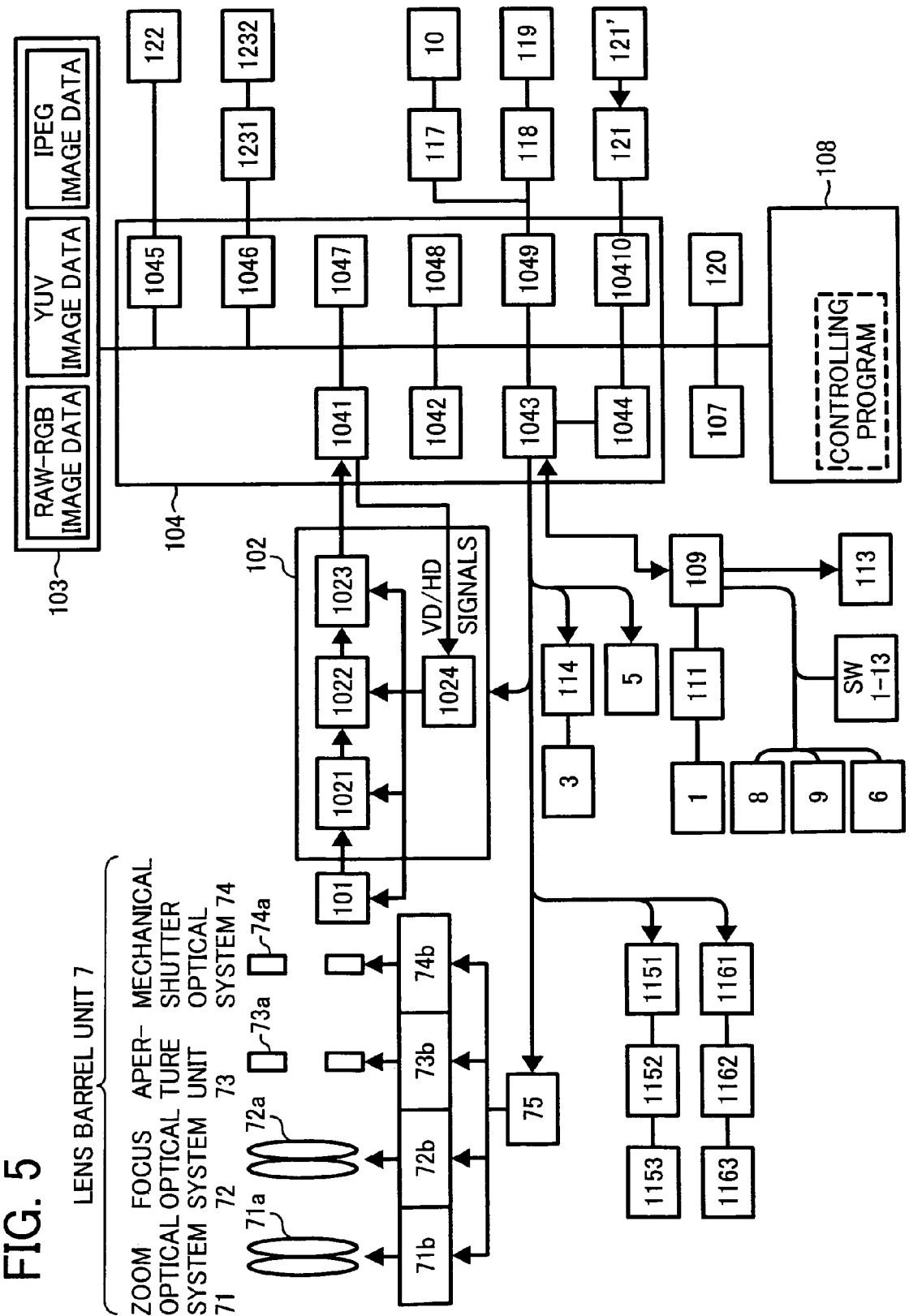
FIG. 5 illustrates a block circuit view schematically showing inner system configurations of the digital camera according to one preferred embodiment of the present invention.

FIG. 1 is a diagram of connection between a digital camera and a printer, FIG. 2 illustrates a front view of one example of the digital camera as a photographic device according to the present invention, FIG. 3 is a rear view, FIG. 4 is a top view respectively, and FIG. 5 is a block circuit view illustrating schematically inner system configurations of the digital camera.

In FIG. 1, reference numeral DCa denotes the digital camera. Reference numeral RP denotes a printer. As shown in FIG. 1, the printer PR is connected to a USB connector 122 of the digital camera DCa via a USB cable. The printer RP is used for printing out photographic images stored on a storing unit (to be described in detail hereinafter) of the digital camera.

As shown in FIG. 2 and FIG. 4, an upper surface of the digital camera is provided with a release switch (release shutter) SW1, a mode dial SW2, a sub liquid crystal display (sub LCD) 1 shown in FIG. 4.

A front surface of the digital camera is provided with a lens barrel unit 7 including a photographing lens, an optical finder 4, a strobe light unit 3, a ranging unit 5, a remote control light-receiving unit 6 and a lid of SD card/battery room 2.

As shown in FIG. 3, a backside of the camera DCa is provided with a power switch 13, a LCD monitor 10, an AF LED 8, a strobe LED 9, the optical finder 4, a wide-angle zoom switch SW3, a telescopic zoom switch SW4, a self-timer set/release switch SW5, a menu switch SW6, an upward/strobe switch SW7, a rightward switch SW8, a display switch SW9, a downward/macro switch SW10, a leftward/image confirming switch SW11, an OK switch SW12 and a quick access switch SW13.

An inner system configuration of the camera DCa will be described hereinafter.

In FIG. 5, reference numeral 104 denotes a digital still camera processor (Hereinafter referred to as a processor).

The processor 104 comprises a CCD1 signal processing block 1041, a CCD2 signal processing block 1042, a CPU block 1043, a local SRAM 1044, a USB block 1045, a serial block 1046, a JPEG CODEC block 1047, a RESIZE block 1048, a TV signal display block 1049 and a memory card controller block 10410. These blocks are connected each other by a bus line.

An outside of the processor 104 is provided with a SDRAM 103 and the SDRAM is connected to the processor 104 via a memory controller (not shown) and a bus line.

The SDRAM 103 has a function for temporarily memorizing photographic images captured from a CCD 101 and thumbnail images.

The outside of the processor 104 is further provided with a RAM 107, an embedded memory 120 and a ROM 108 which stores a controlling program, and these are also connected to the processor 104 via a bus line.

In the preferred embodiment of the present invention, the ROM 108 is provided with a determination unit for determining whether the photographic images are of flawless photographic images or flawed photographic images and a controlling program such as an correlating unit for performing a correlation among the flawed photographic images, file names of the flawed photographic images and categories of the flawed photographic images, respectively.

Then, the controlling program is retrieved from the ROM 108 and stored in the embedded memory 120 when the digital camera of the present invention is initialized. A retrieving speed of the embedded memory 120 is faster than that of the ROM 108, so that the controlling program can be executed in a high speed by retrieved from the ROM 108 and stored in the embedded memory 120.

The lens barrel unit 7 comprises a zoom optical system 71 having a zoom lens 71a, a focus optical system 72 having a focus lens 72a, an aperture unit 73 having an aperture 73a and a mechanical shutter optical system 74 having a mechanical shutter 74a.

The zoom optical system 71, the focus optical system 72, the aperture unit 73 and the mechanical shutter optical system 74 are driven by a zoom motor 71b, a focus motor 72b, an aperture motor 73b and a mechanical shutter motor 74b, respectively.

These motors are driven by a motor driver 75, and the motor driver 76 is controlled by the mechanical shutter motor 74b.

A subject image is formed on the CCD 101 through each lens system of the lens barrel unit 7. The CCD 101 converts the subject image into an image signal, and outputs the image signal to a F/F-IC 102. The F/E-IC102 includes a CDS 1021, an AGC 1022 and An A/D converting unit 1023, which are well known in the art.

The F/F-IC 102 performs a predefined processing on the image signal and converts it to a digital signal, then outputs the digital signal to the CCD1 signal processing block 1041 of the processor 104.

These signal processing operations are performed via a TG 1024 according to VD/HD signals outputted from the COD1 signal processing block 1041 of processor 104.

The CPU block 1043 of the processor 104 is configured to control a sound recording circuit 1151 which performs a sound recording operation. A sound is converted to a sound recording signal by a microphone 1153 and amplified by a microphone amplifier 1152. The sound recording circuit 1151 records the amplified signal according to a command.

The CPU block 1043 also controls operations of a sound reproduction circuit 1161. The sound reproduction circuit 1161 is configured to output sound signals stored in a proper memory according to a command to an audio amplifier 1162 and reproduce the sound signals from a speaker 1163.

Furthermore, the CPU block 1043 controls a strobe light circuit 114 for making the strobe light unit 3 emit lights. In addition, the CPU block 1043 also controls the ranging unit 5.

The CPU block 1043 is connected to a sub-CPU 109 of the processor 104 and the sub CPU 109 controls displaying on the sub LCD 1 via a CCD driver 111. The sub CPU 109 is further connected with the AF LED 8, the strobe LED 9, the remote-control light-receiving unit 6, an operation key unit having the operation switches SW1~SW13, and a buzzer 113.

The USB block 1045 is connected to a USB connector 122, and the serial block 1046 is connected to a RS-232C connector 1232 through a serial driver circuit 1231. The TV signal display block 1049 is connected to the LCD monitor 10 via a LCD driver 117 and a video jack 119 via a video amplifier 118.

The memory card controller block 10410 is connected to a contact point between a memory card throttle 121 and a memory card. A memory card 121' which is connecting with the memory card throttle 121 serves as a storing unit for storing the photographic images.

General operations of the camera according to the present invention will be described schematically hereinafter.

The camera DCa is initialized at a recording mode when the mode dial SW2 is set at the recording mode. The processor 104 determines whether the mode switch is set ON at the recording mode and performs settings on the mode dial SW2.

The processor 104 controls the motor driver 75 to move the lens barrel unit 7 to a proper photographing position. In addition, the processor 104 switches on each circuit of the CCD 101, F/E-IC 102 and LCD monitor 10 etc for a ready operation. A finder mode is initialized for operating when each circuit is powered on.

In the finder mode, incoming lights to the CCD 101 through each lens system are photo-electrically converted into RGB analog signals and transmitted to the CDS circuit 1021 and the A/D converter 1023. The A/D converter 1023 converts the analog signals to digital signals, and the digital signals are converted to YUV signals by a YUV converter disposed in a digital signal processor IC (the SDRAM 103) and written into a frame memory by a memory controller (not shown).

The YUV signals are retrieved by the memory controller, and sent to a TV (not shown) or the LCD monitor 10 through the TV signal display block 1049.

Functions of the camera DCa will be described in detail hereinafter.

The digital camera DCa shown in FIG. 1 comprises the storing unit for storing photographic images; the determination unit for determining whether the photographic images are of flawless photographic images or flawed photographic images; the print-out executing unit for printing out the photographic images stored in the storing unit; and the correlating unit for performing a correlation among the flawed photographic images, file names and categories of the flawed photographic images, respectively. The correlating unit correlates the flawed photographic images with the thumbnails and text information, and prepares the list of flawed photographic images indicating the correlation.

It is possible for the digital camera DCa to print out the photographic images including the flawless photographic images and/or the flawed photographic images and/or the list of flawless photographic images.

Conventional programs are used to determine whether a photographic image is of a flawed image or a flawless image.

For example, a photographic image may be determined to be a blurred image by calculating a contrast of an actual subject. Specifically, the subject's region may be firstly determined from the photographic image based on a ranging position recorded in attribution information contained in the photographic image file. Then, a brightness difference between plural pixels included in the determined subject's region and that included in each of adjacent regions. The contrast of the subject's region may be obtained by adding up each of the calculated brightness difference. Thus the photographic image is determined to be a blurred image if the calculated contrast is smaller than a predefined value.

A photographic image may be determined to be a bad exposure image by accumulating histograms based on the brightness information of the image file, and then comparing a peak value of the calculated histogram to a standard value. Specifically, a photographic image is determined to be a bad exposure image if the peak value of the calculated histogram is beyond a predefined amount of the standard value, that is, in a position of a brighter side or a darker side out of the predefined amount of the standard value.

Furthermore, a photographic image may be determined to be a camera-shaking image by adding a photographing shutter speed recorded in the attribution information contained in the image file to the aforementioned determination method of a blurred image. Specifically, a photographic image is determined not to be a blurred image but a camera-shaking image instead if the photographing shutter speed is detected to be lower than a predefined shutter speed by the aforementioned determination method of a blurred image.

Figure 6:
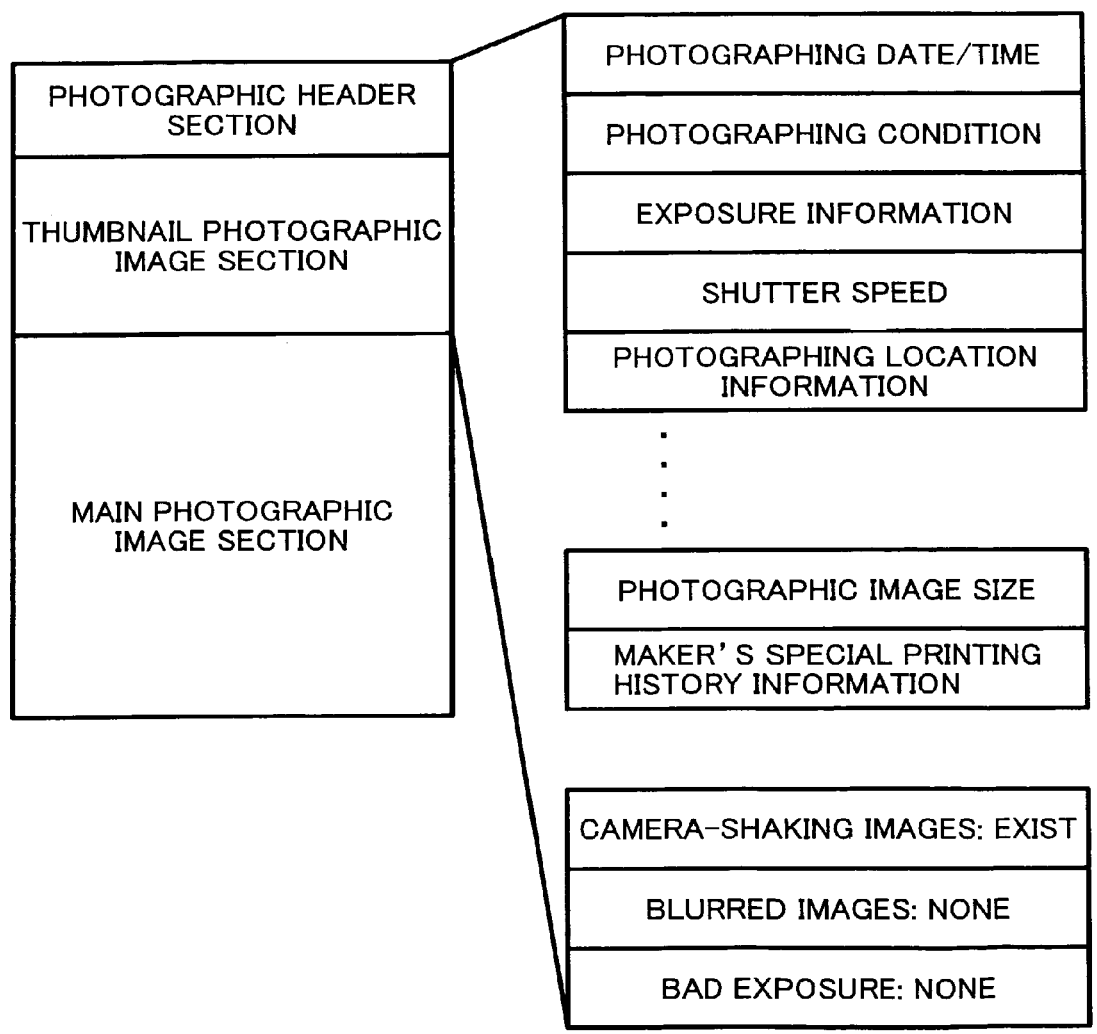
FIG. 6 illustrates a view showing a format of a photographic image of the digital camera according to one preferred embodiment of the present invention.

FIG. 6 illustrates a view showing a format of a photographic image of the digital camera as one example of the correlating unit. The format of the photographic image is mainly divided into three sections: a photographic header section, a thumbnail photographic image section and a main photographic image section in an order from the top.

The photographic image header section is a free area used by various makers. A photographing date/time, a photographing condition, exposure information, a shutter speed, a photographing location information, and other information such as ON/OFF of a strobe light, photographic image size, and maker's special printing history information are recorded in conformity with EXIF file format in the photographic image header section.

Information about the existence of the flawed photographic images determined by the determination unit and categories of the flawed photographic images are also recorded in the photographic image header section. For example, if the flawed photographic images are only the camera-shaking images, they will be categorized and recorded as "camera-shaking images: exist; blurred images: none; bad exposure: none".

The thumbnail image section is used for displaying thumbnails when the digital camera DCa is replayed. A plurality of thumbnail images are stored with reduced image sizes for example 640×480 pixels, since there is a demanded for the plural thumbnail images to be displayed on the LCD monitor 10 in a high speed.

The main photographic image section is stored with the master photographic images in a compressed format, such as JPEG etc.

Hereinafter, a selecting mode for selecting print-outs of the photographic images used by the digital camera DCa according to the invention will be explained.

Figure 7:
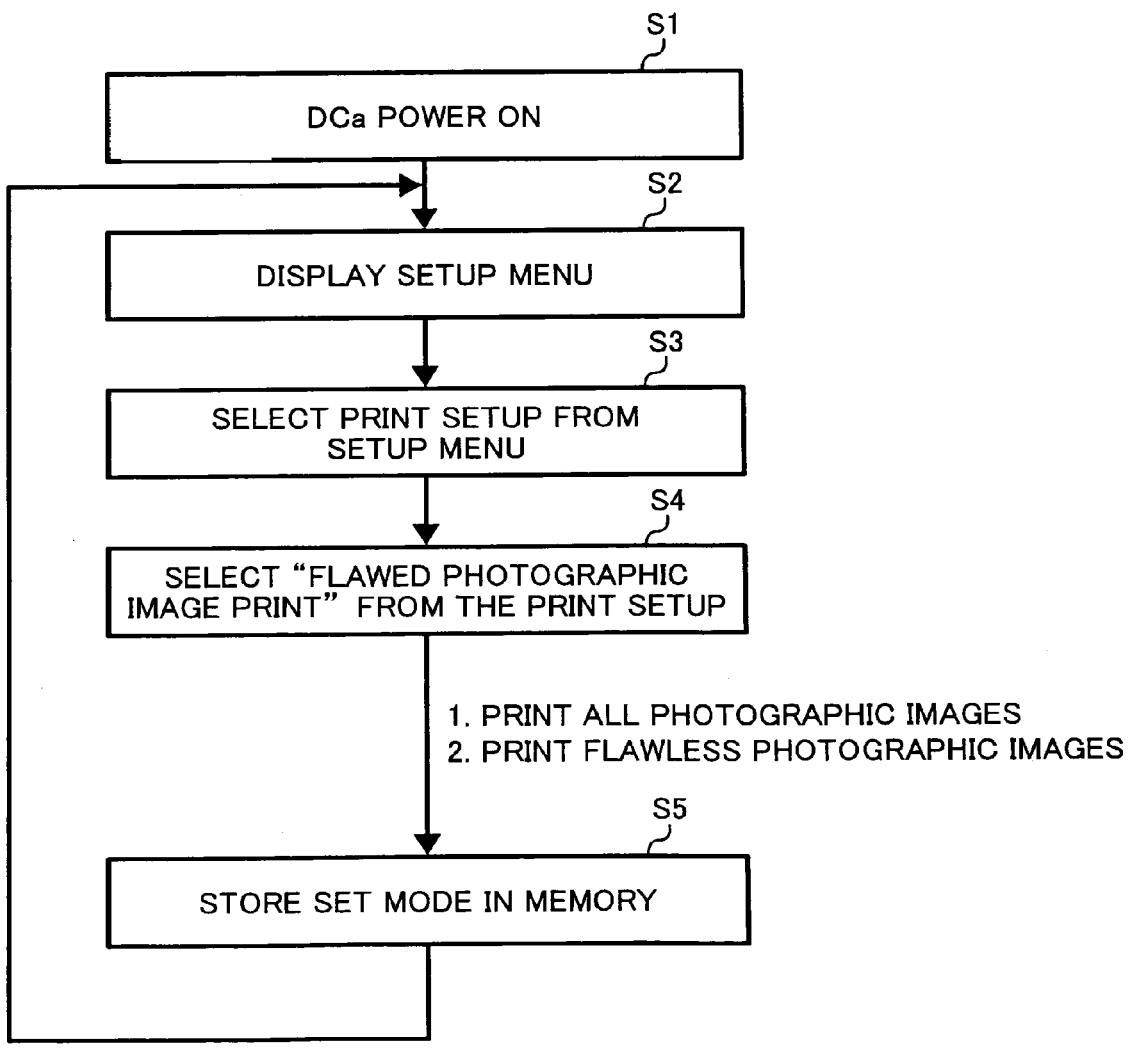
FIG. 7 illustrates a flow chart relating to a mode selection on printing photographic images of the digital camera according to one preferred embodiment of the present invention.

When the power switch 13 (See FIG. 3) of the digital camera DCa is set ON (See S.1 of FIG. 7), there is displayed on the LCD monitor 10 a setup menu not shown in FIGS (See S.2 of FIG. 7). A print setup screen shown in FIG. 8 is displayed when the print setup is selected from the setup menu (See S.3 of FIG. 7). Items such as "flawed photographic image print", "paper type", "paper size" and "date/time print" are displayed on the print setup screen.

When the item "flawed photographic image print" of the print setup screen shown in FIG. 7 is selected (See S.4 of FIG. 7), that is, the sub-menu "flawed photographic image print" shown in FIG. 8 is set to "YES", the flawless and flawed photographic images will be printed in a all-print-out mode through the printer RP; while when the sub-menu "flawed photographic image print" shown in FIG. 8 is set to "NO", the list of flawed photographic images together with the flawless photographic images will be printed out in a list print-out mode through the printer RP.

Selected print-out mode corresponding to each item is then stored in memory as a setting value (See S.5 of FIG. 7).

In the next, print-outs of various photographic images photographed by the digital camera DCa will be described.

Figure 9A:
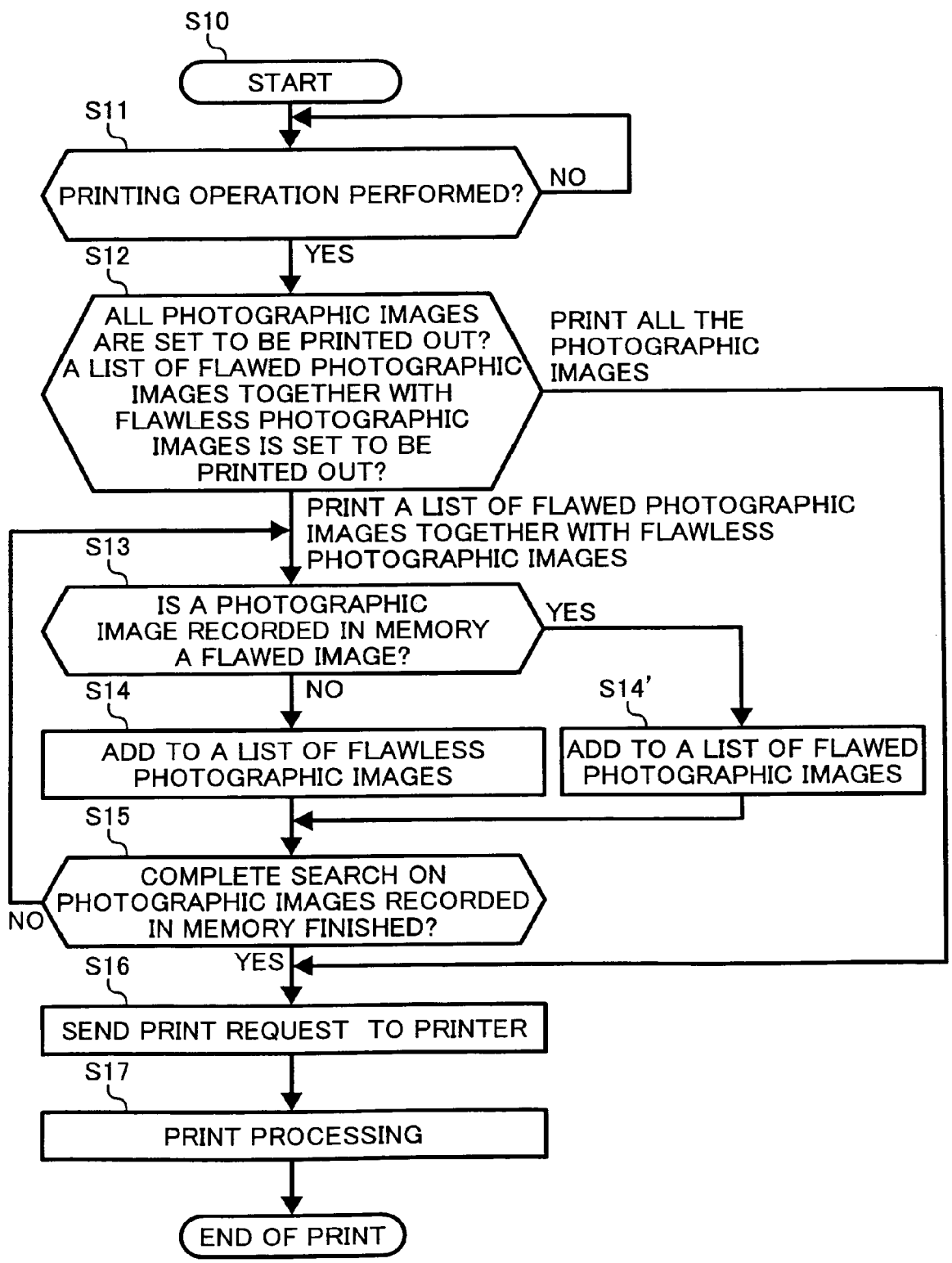
FIG. 9A illustrates a flow chart of a photographic image printing procedure according to one preferred embodiment of the present invention.

A print screen (not shown) is firstly displayed on the LCD monitor 10 (See FIG. 3). A flow chart shown in FIG. 9 is used to describe a print-out executed When a printing program of the digital camera DCa is started (See S.10 of FIG. 9A), the print-out executing unit determines whether a printing operation is performed (See S.11 of FIG. 9A). The flow chart returns to step S.11 when a printing operation is not performed. If there is a printing operation performed, the flow chart moves to step S.12 where it is determined whether all of the photographic images are set to be printed out or the list of flawed photographic images together with the flawless photographic images is set to be printed out.

If all the photographic images are set to be printed out in step S.12, the digital camera DCa sends a print request to the printer RP to print out all the photographic images including the flawless and flawed photographic images (See S.16 of FIG. 9A). The printer RP receives the image data for printing on the photographic printing paper according to the print request (See S.17 of FIG. 9A).

If the list of flawed photographic images together with the flawless photographic images are set to he printed out in the step S.12, the determination unit of the digital camera DCa retrieves the photographic images recorded in the recording unit, and determines the photographic images are of the flawless or flawed photographic images (See S.13 of FIG. 9A).

When a photographic image is determined to be of a flawless photographic image in S.13, it is added to the list of flawless photographic images (Sec S.14 of FIG. 9A) and the flow chart moves to step S.15.

When a photographic image is determined to be of a flawed photographic image in S.13, it is added to the list of flawed photographic images after a correlation processing (See S.14' of FIG. 9A) and the flow chart moves to step S.15.

A script program used in the correlation processing will be described hereinafter.

The print-out executing unit repeats operations of step S.13, S.14 (S.14') and S.15 until a retrieval on all the photographic images is complete. The print request of the list of flawed photographic images is thus delivered to the printer RP as well as the print request of the flawless photographic image after the retrieval of all the photographic images is complete (See S.16 of FIG. 9A). The printer RP performs the print processing (See S.17 of FIG. 9A) and the flow chart moves to an end.

A print request script shown in FIG. 9B is used as the script program. The script program is a correlating program which performs a correlation among the flawed photographic images, file names and categories of the flawed photographic images, respectively, and display a correlation among the list of flawed photographic images, a thumbnail list and categories of the flawed photographic images in characters.

In FIG. 9B, although the category of the flawed photographic image is expressed by characters "blurring", it is preferred to use a graphical image representing "blurring" as an alternative to the characters "blurring". Similarly, it is also preferred to use a graphical image representing characters "camera-shaking" or "bad exposure" as an alternative to the characters "camera-shaking" or "bad exposure".

Figure 10:
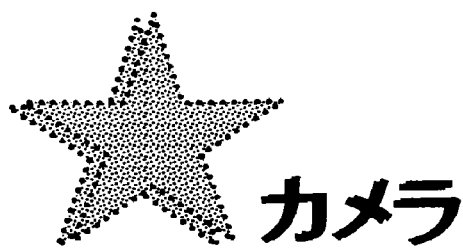
FIG. 10 illustrates one example of a list of the flawed photographic images with thumbnails according to one preferred embodiment of the present invention.
Figure 10:
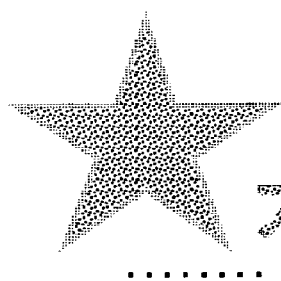
Figure 10:
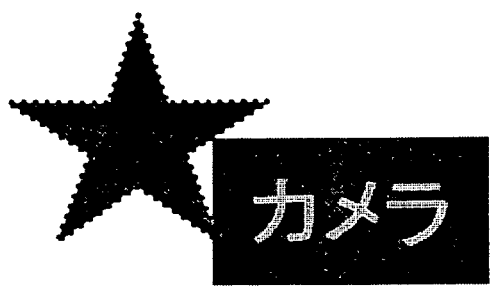

FIG. 10 shows one example of a printed photographic printing paper in which the thumbnails, categories and file names of the flawed photographic iamges are correlated and classified.

In FIG. 10, the camera-shaking, blurring and bad exposure photographic images are displayed schematically. For example, a partially overlapped image with a file name RIMG001.JPG is an example of the camera-shaking photographic image; a blurred image with a file name RIMG006.JPG represents an example of the blurring photographic image; and a generally dark image with a file name RIMG007.JPG indicates an example of the bad exposure photographic image.

The aforementioned script program as the correlating unit for performing a correlation between the file name and categories of the flawed photographic images makes it possible to obtain a list of the flawed photographic images classified by the file names and categories as shown in FIG. 11 for printing.

Furthermore, the digital camera DCa of the present invention is provided with a counting unit for counting printing counts of the flawed photographic image.

Figure 12A:
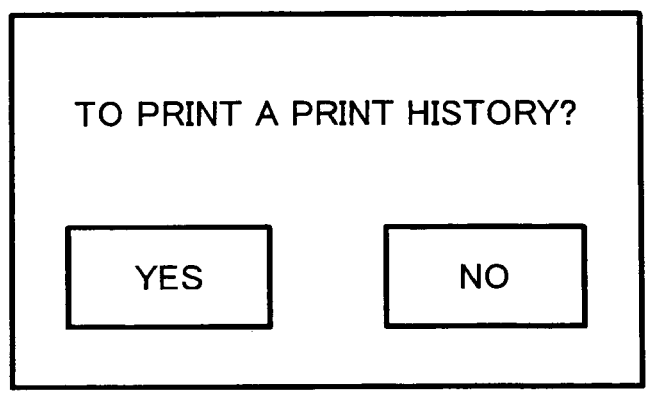
FIG. 12A illustrates a printing history screen displayed on a LCD monitor.

For example, the print history screen shown in FIG. 12A is displayed on the LCD monitor 10 (shown FIG. 3), and if the menu "Yes" is selected, a list of the flawed photographic images with the flawed photographic images, file names and printing counts correlated to each other is printed out.

Figure 12B:
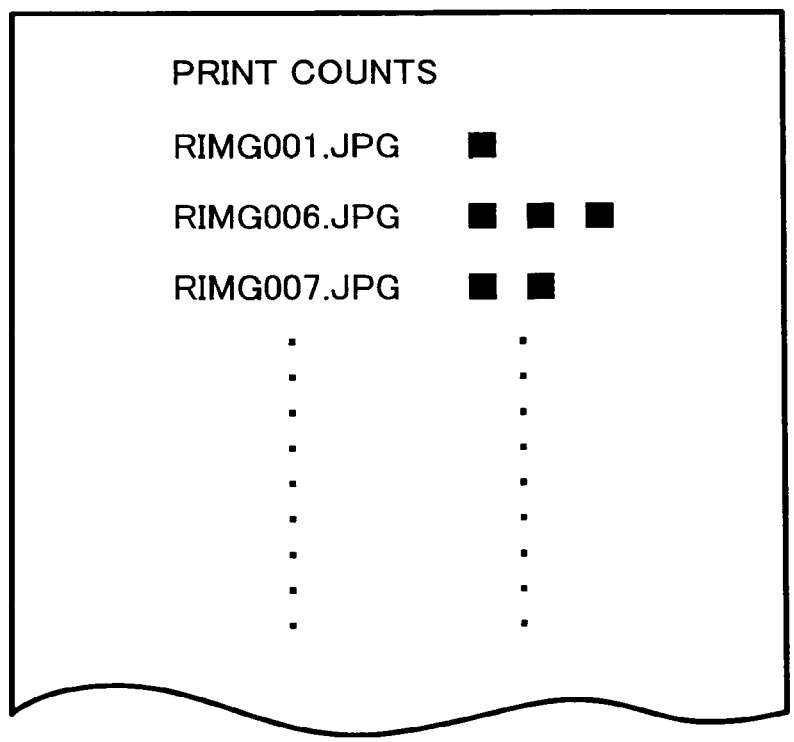
FIG. 12B illustrates a printing history printed out with file names of the flawed photographic images and printing counts expressed with black blocks, respectively.

As shown in FIG. 12B, for example the camera-shaking image RIMG001.JPG, the blurring image RIMG006.JPG and the bad exposure image RIMG007.JPG are printed out till now for 1, 3 and 2 times respectively expressed with black blocks. Therefore, it is possible to determine how many times that a flawed photographic image has been printed out.

What is claimed:

1. A digital camera printing system for use with applied on a digital camera, comprising:
    a memory storing unit configured to store for storing photographic images;
    a determination unit configured to determine for determining whether the photographic images are flawless or flawed photographic images; and
    a print-out executing unit configured for executing print-out of the photographic images stored in the memory storing unit;
    wherein the digital camera printing system is configured to selectively execute an all-print-out mode configured to print for printing out all images which include the flawed and the flawless photographic images, and a list print-out mode configured to print for printing out a list of the flawed photographic images without printing the flawed photographic images, together with images of the flawless photographic images.

2. The digital camera printing system according to claim 1, wherein the list of flawed photographic images includes file names of the flawed photographic images.

3. The digital camera printing system according to claim 1, wherein the determination unit determines the flawed photographic images for a plurality of categories.

4. The digital camera printing system according to claim 3, further comprising:
    a correlating unit for performing correlation among the flawed photographic images, file names and categories of the flawed photographic images, respectively; and
    wherein the list of the flawed photographic images include the file names and the categories of the flawed photographic images correlated respectively to the file names.

5. The digital camera printing system according to claim 3, further comprising:
    a correlating unit for performing correlation between file names and thumbnails, respectively, and
    wherein the list of flawed photographic images which is printed includes the file names and thumbnails correlated respectively to the file names.

6. The digital camera printing system according to claim 3, further comprising:
    a correlating unit for performing correlation among file names, thumbnails and categories of the flawed photographic images, respectively, and
    wherein the list of the flawed photographic images which is printed includes the file names, the thumbnails and the categories of the flawed photographic images correlated respectively to the file names.

7. The digital camera printing system according to claim 4 or 6, wherein the respective categories of the flawed photographic image are expressed with characters.

8. The digital camera printing system according to claim 4 or 6, wherein the respective categories of the flawed photographic images are expressed with graphics.

9. The digital camera printing system according to claim 4, wherein whether printing counts of the printed flawed photographic images are included or not in the list of flawed photographic images is selectable when the list of the flawed photographic images is printed.

10. A digital camera, comprising:
- a memory storing unit configured to store for storing photographic images;
- a determination unit configured to determine for determining whether the photographic images are flawless or flawed photographic images;
- a print-out executing unit configured to print printing out the photographic images stored in the memory on the storing unit; and
- a selecting unit configured to selectively execute for selectively executing an all-print-out mode configured to print for printing out all images which include the flawed and the flawless photographic images, and a list print-out mode configured to print for printing out a list of the flawed photographic images together with images of the flawless photographic images, without printing the flawed photo graphic images.

11. The digital camera according to claim 10, wherein the print-out executing unit prints out the list of flawed photographic images including file names of the flawed photographic images.

12. The digital camera according to claim 10, wherein the determination unit determines the flawed photographic images for a plurality of categories.

13. The digital camera according to claim 10, wherein the print-out executing unit includes:
- a correlating unit configured to correlate for performing correlation among the flawed photographic images, file names and categories of the flawed photographic images, respectively, and to output the list of the flawed photographic images correlated respectively to the file names and categories of the flawed photographic images.

14. The digital camera according to claim 12, wherein the print-out executing unit includes:
- a correlating unit configured to correlate for performing correlation between file names and thumbnails, respectively, and output the list of flawed photographic images correlated respectively to the file names and thumbnails.

15. The digital camera according to claim 12, wherein the print-out executing unit includes a correlating unit for performing correlation among file names, thumbnails and categories of the flawed photographic images, respectively, and outputs the list of the flawed photographic images correlated respectively to the file names, the thumbnails and the categories of the flawed photographic images.

16. The digital camera according to claim 13 or 15, wherein the respective categories of the flawed photographic image are expressed with characters.

17. The digital camera according to claim 13 or 15, wherein the respective categories of the flawed photographic image are expressed with graphics.

18. The digital camera according to claim 13, wherein whether printing counts of the printed flawed photographic images are included or not in the list of the flawed photographic images is selectable when the list of the flawed photographic images is printed.

* * * * *